(12) United States Patent
Makita

(10) Patent No.: US 7,602,583 B2
(45) Date of Patent: Oct. 13, 2009

(54) DISC CLAMPING DEVICE AND DISC DRIVE HAVING THE SAME

(75) Inventor: Akihiko Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 11/390,150

(22) Filed: Mar. 28, 2006

(65) Prior Publication Data

US 2007/0146927 A1 Jun. 28, 2007

(30) Foreign Application Priority Data

Dec. 28, 2005 (JP) ............................. 2005-380320

(51) Int. Cl.
*G11B 17/038* (2006.01)
*G11B 17/022* (2006.01)

(52) U.S. Cl. .................. 360/99.12; 360/98.08
(58) Field of Classification Search .............. 360/98.08, 360/99.12
See application file for complete search history.

(56) References Cited

U.S. PATENT DOCUMENTS

| 4,958,839 | A | * | 9/1990 | Guzik et al. ............... 279/2.14 |
| 5,373,407 | A | * | 12/1994 | Stupak et al. ............ 360/99.08 |
| 5,517,376 | A | * | 5/1996 | Green ..................... 360/98.08 |
| 5,744,882 | A | * | 4/1998 | Teshima et al. ........... 310/67 R |
| 6,028,739 | A | * | 2/2000 | Lindrose ................... 360/99.12 |
| 6,822,826 | B2 | * | 11/2004 | Choo et al. ............... 360/99.12 |
| 6,888,699 | B2 | * | 5/2005 | Drake et al. .............. 360/99.12 |
| 7,158,343 | B2 | * | 1/2007 | Kim ........................ 360/99.12 |
| 7,239,476 | B2 | * | 7/2007 | Chan et al. ................ 360/98.08 |
| 2004/0012882 | A1 | * | 1/2004 | Kim et al. ................. 360/99.12 |
| 2005/0099723 | A1 | * | 5/2005 | Momoi ..................... 360/99.12 |
| 2006/0126220 | A1 | * | 6/2006 | Okamoto et al. ......... 360/99.12 |

FOREIGN PATENT DOCUMENTS

| JP | 63102082 A | * | 5/1988 |
| JP | 08017133 A | * | 1/1996 |
| JP | 2001-331995 | | 11/2001 |
| JP | 2002197763 A | * | 7/2002 |
| JP | 2004095054 A | * | 3/2004 |
| JP | 2004288309 A | * | 10/2004 |
| WO | WO 02095746 A1 | * | 11/2002 |

* cited by examiner

*Primary Examiner*—William J Klimowicz
(74) *Attorney, Agent, or Firm*—Kratz, Quintos & Hanson, LLP

(57) ABSTRACT

A clamping device that fixes a disc onto a spindle motor that rotates the disc includes a clamp ring that is layered on the disc, and a screw that fixes the clamp ring onto the spindle motor, and has a seating surface that inclines relative to a plane perpendicular to an axis of the screw, the seating surface of the screw having an inclined angle greater than a plane that contacts the seating surface of the screw of the clamp ring before the clamp ring is fixed by the screw.

5 Claims, 8 Drawing Sheets

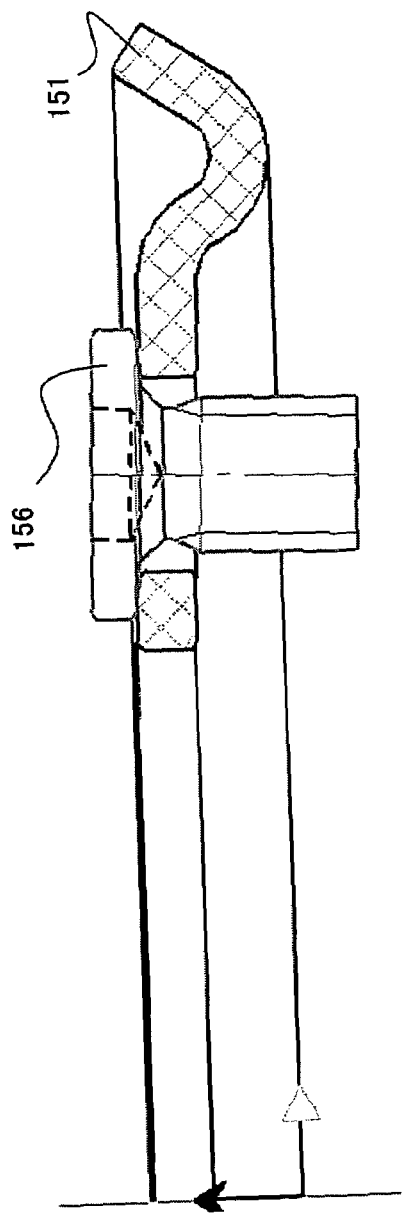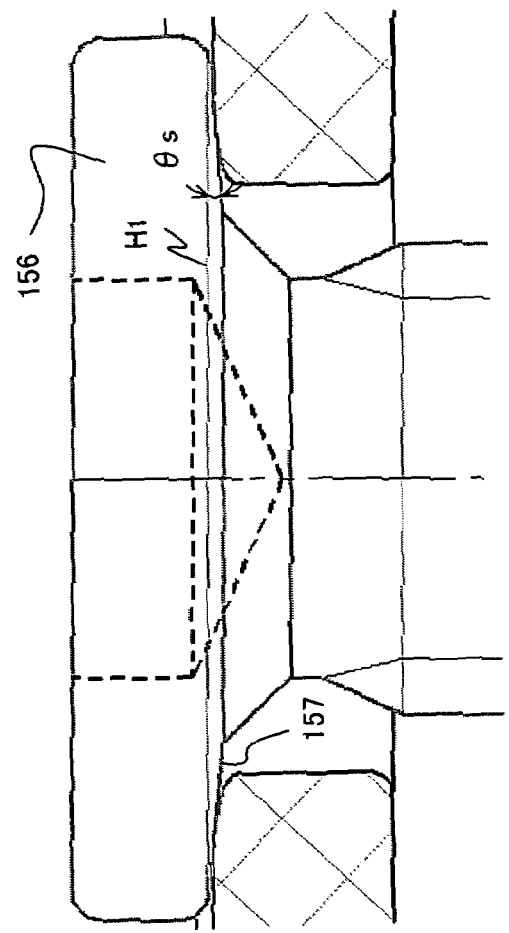
FIG. 4D
FIG. 4E

DISC CLAMPING DEVICE AND DISC DRIVE HAVING THE SAME

This application claims the right of a foreign priority based on Japanese Patent Application No. 2005-380320, filed on Dec. 28, 2005, which is hereby incorporated by reference herein in its entirety as if fully set forth herein.

BACKGROUND OF THE INVENTION

The present invention relates generally to a recorder, and more particularly to a retainer for a recording medium in the recorder. The present invention is suitable, for example, for a clamping device that fixes a disc onto a spindle hub in a hard disc drive ("HDD").

Along with the recent spread of the Internet etc., a demand for fast recording of a large amount of information is growing. A magnetic disc drive, such as an HDD, is required to have a larger capacity and an improved response. For the larger capacity, the HDD narrows a track pitch on the disc and increases the number of installed discs. For the improved response, use of a higher speed spindle motor is promoted.

Plural discs are stacked around a hub that is fixed around a rotating shaft of the spindle motor, and capped by a clamp ring. The clamp ring fixes these discs when the clamp ring is screwed onto the hub. The number of screws is one, three, four (Japanese Patent Application, Publication No. 2001-331995), six, etc. The clamp ring and the screw(s) rotate with the disc.

A recent high-density disc requires highly precise head positioning. It is thus necessary to restrain vibrations applied to and deformations of the disc, and to correct a weight imbalance (simply referred to as "imbalance" hereinafter) around the spindle motor axis. A primary factor of the imbalance is an imbalance between the disc and the spindle motor moving part. Various imbalance correcting methods are known, such as a first method that reduces an aperture between the disc and the spindle hub, a second method for moving a disc to a balancing position, and a third method that attaches a balancer.

As more precise head positioning is required, the influence due to the clamp ring, i.e., an offset between a center of gravity and a rotating center of the screwed clamp ring becomes non-negligible. The first method does not correct the clamp ring caused imbalance, and has a difficulty in reducing the imbalance. The second and third methods can correct the clamp ring caused imbalance, but they need to correct both the imbalance of the clamp ring and the imbalances of the disc and the spindle motor moving part. The second method results in a large moving amount of the recording medium. The third method requires a large weight.

Methods of reducing the clamp ring caused imbalance include a fourth method that restricts a clamping position by a close engagement between the spindle motor and the clamp ring, and a fifth method that uses a jig and restricts a clamping position in assembly. The HDD hates dust or particles caused by contact frictions, and requires an aperture in assembly. Therefore, the fourth method has a limited restricting amount. The improved working precision to the components is needed for a narrow aperture, but this would result in an increased cost. In addition, the fifth method disadvantageously requires a highly precise facility.

Thus, the clamp ring should be made slightly larger, and the imbalance amount should be eliminated by a simple method.

BRIEF SUMMARY OF THE INVENTION

The present invention is directed to a clamping device and method, and a disc drive having the clamping device, which fix a disc relatively inexpensively and simply.

A clamping device according to one aspect of the present invention that fixes a disc onto a spindle motor that rotates the disc includes a clamp ring that caps the disc, and a screw that fixes the clamp ring onto the spindle motor, and has a seating surface that inclines relative to a plane perpendicular to an axis of the screw, the seating surface of the screw having an inclined angle greater than a plane that contacts the seating surface of the screw of the clamp ring before the clamp ring is fixed by the screw. This clamping device enables the screw's seating surface to contact the edge of the screw hole, and to move the clamp ring so that a screw portion moves to a center of the screw hole.

Preferably, the clamp ring may have a screw hole into which the screw is inserted, wherein an inclination angle of the screw hole is greater than (for example, three times as large as) that of the seating surface of the screw. This configuration can enhance a positioning effect. Preferably, the clamp ring has a portion that contacts the seating surface and has an arc-shaped section (R shape). This configuration can prevent generations of burrs and contaminations.

A disc drive that includes the above clamping device also constitutes another aspect of the present invention.

A clamping method according to another aspect of the present invention that fixes a disc onto a spindle motor that rotates the disc via a clamp ring, the clamping method comprising the step of positioning to a screw hole a screw that fixes the clamp ring, onto the spindle motor, based on a shape of a seating surface of the screw, and shapes of both the clamp ring and the screw hole in the clamp ring. This method provides simple and inexpensive positioning based on shape control.

Other objects and further features of the present invention will become readily apparent from the following description of the preferred embodiments with reference to accompanying drawings.

BRIEF DESCRIPTION OF THE DRAWINGS

FIG. 4D is a partially enlarged sectional view of FIG. 3. FIG. 4E is a partially enlarged sectional view of FIG. 4D.

DETAILED DESCRIPTION OF THE PREFERRED EMBODIMENTS

Figure 1:
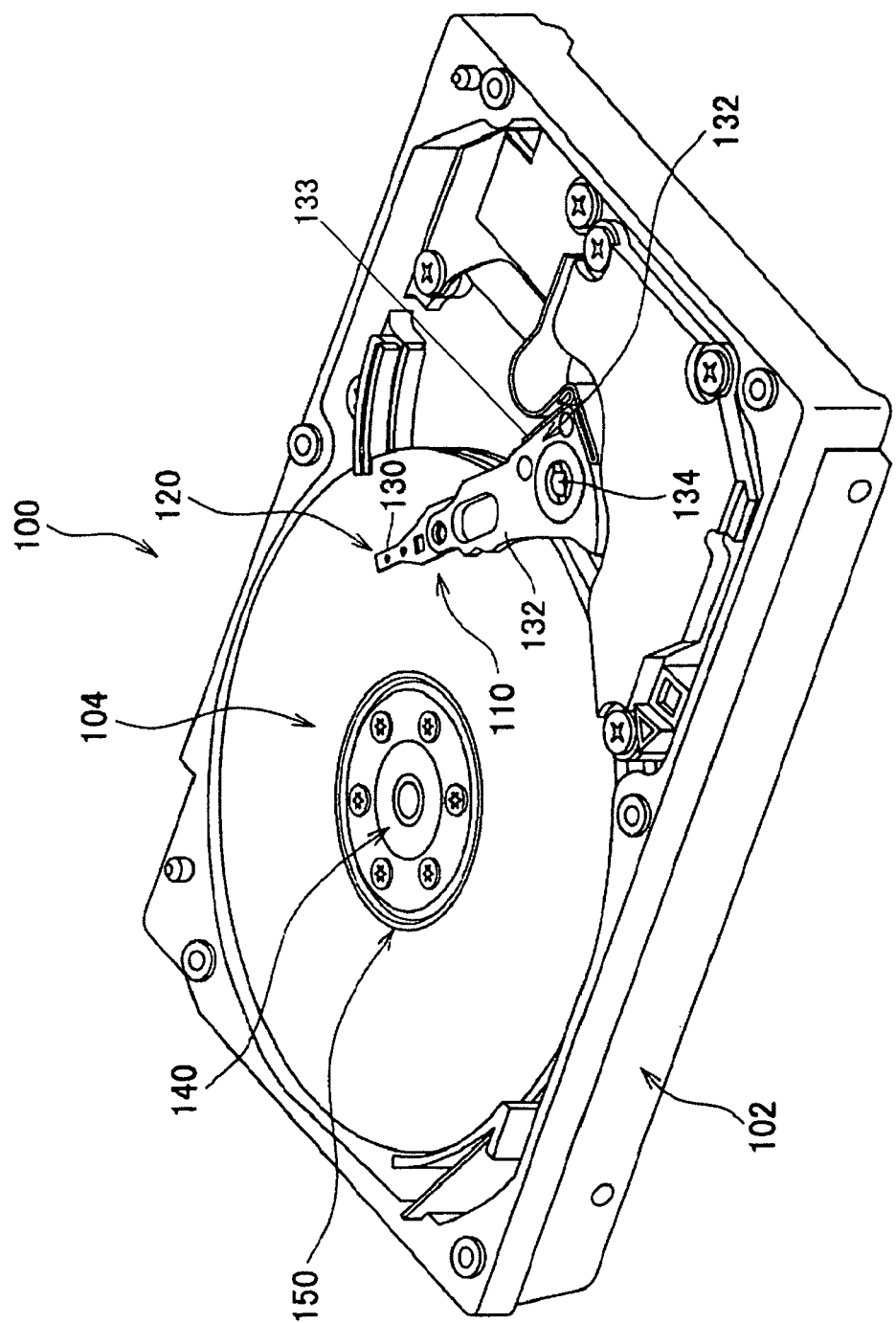
FIG. 1 is an internal structure of a hard disc drive ("HDD") according to one embodiment of the present invention.

Referring now to the accompanying drawings, a description will be given of a HDD 100 according to one embodiment of the present invention. The HDD 100 includes, as shown in FIG. 1, plural magnetic discs 104 each serving as a recording medium, a head stack assembly ("HSA") 110, a spindle motor 140, and clamping device 150 in a housing 102. Here, FIG. 1 is a schematic plane view of the internal structure of the HDD 100.

The housing is made, for example, of aluminum die cast base and stainless steel, and has a rectangular parallelepiped shape to which a cover (not shown) that seals the internal space is jointed. The magnetic disc 104 of this embodiment has a high surface recording density, such as 200 Gb/in$^2$ or greater. The magnetic disc 104 is mounted on a spindle of the spindle motor 140 through its center hole.

The HSA 110 includes a magnetic head part 120, a suspension 130, and a carriage 132.

Figure 2:
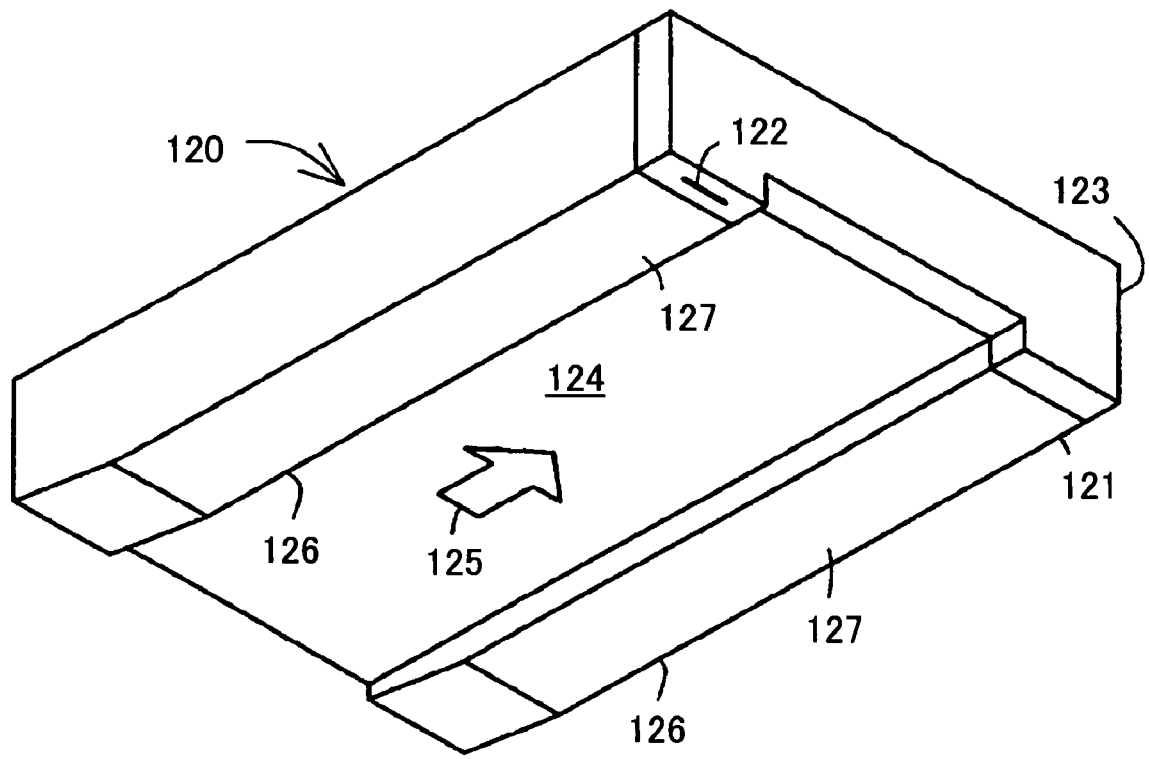
FIG. 2 is an enlarged perspective view of a magnetic head part in the HDD shown in FIG. 1.

The magnetic head 120 includes, as shown in FIG. 2, an approximately rectangular parallelepiped, $Al_2O_3$—TiC (Altic) slider 121, and an $Al_2O_3$ (alumna) head device built-in film 123 that is jointed with an air outflow end of the slider 121 and has a reading/recording head 122. Here, FIG. 2 is an enlarged perspective view of the magnetic head part 120. The slider 121 and the head device built-in film 123 define a medium opposing surface to the magnetic disc 104, i.e., a floating surface 124. The floating surface 124 receives an airflow 125 that occurs with rotations of the magnetic disc 104.

A pair of rails 126 extend on the floating surface 124 from the air inflow end to the air outflow end. A top surface of each rail 126 defines a so-called air-bearing surface ("ABS") 127. The ABS 127 generates the buoyancy due to actions of the airflow 125. The head 122 embedded into the head device built-in film 123 exposes from the ABS 127. The floating system of the magnetic head part 120 is not limited to this mode, and may use known dynamic and static pressure lubricating systems, piezoelectric control system, and other floating systems. The activation system may be a contact start stop ("CSS") system in which the magnetic head part 120 contacts the disc 104 at the stop time, or a dynamic or ramp loading system in which the magnetic head part 120 is lifted up from the disc 104 at the stop time and held on the ramp outside the disc 104 while the magnetic head part 120 does not contact the disc 104, and the magnetic head part 120 is dropped from the holding part to the disc 104 at the start time.

The head 122 is an MR inductive composite head that includes an inductive head device that writes binary information in the magnetic disc 104 utilizing the magnetic field generated by a conductive coil pattern (not shown), and a magnetoresistive ("MR") head that reads the binary information based on the resistance that varies in accordance with the magnetic field applied by the magnetic disc 104. A type of the MR head device is not limited, and may use a giant magnetoresistive ("GMR"), a CIP-GMR ("GMR") that utilizes a current in plane ("CIP"), a CPP-GMR that utilizes a perpendicular to plane ("CPP"), a tunneling magnetoresistive ("TMR"), an anisotropic magnetoresistive ("AMR"), etc.

The suspension 130 serves to support the magnetic head part 120 and to apply an elastic force to the magnetic head part 120 against the magnetic disc 104, and is, for example, a Watrous type suspension made of stainless steel. This type of suspension has a flexure (also referred to as a gimbal spring or another name) which cantilevers the magnetic head part 120, and a load beam (also referred to as a load arm or another name) which is connected to the base plate. The suspension 130 also supports a wiring part that is connected to the magnetic head part 120 via a lead etc. Via this lead, the sense current flows and read/write information is transmitted between the head 122 and the wiring part.

The carriage 132 swings around a support shaft 134 by a voice coil motor (not shown). The carriage 132 is also referred to as an "actuator," an "E-block" due to its E-shaped section or "actuator ("AC") block." A support portion of the carriage is referred to as an "arm," which is an aluminum rigid body that can rotate or swing around the support shaft 134. The flexible printed circuit board ("FPC") 133 provides the wiring part with a control signal, a signal to be recorded in the disc 104, and the power, and receives a signal reproduced from the disc 104.

Figure 3:
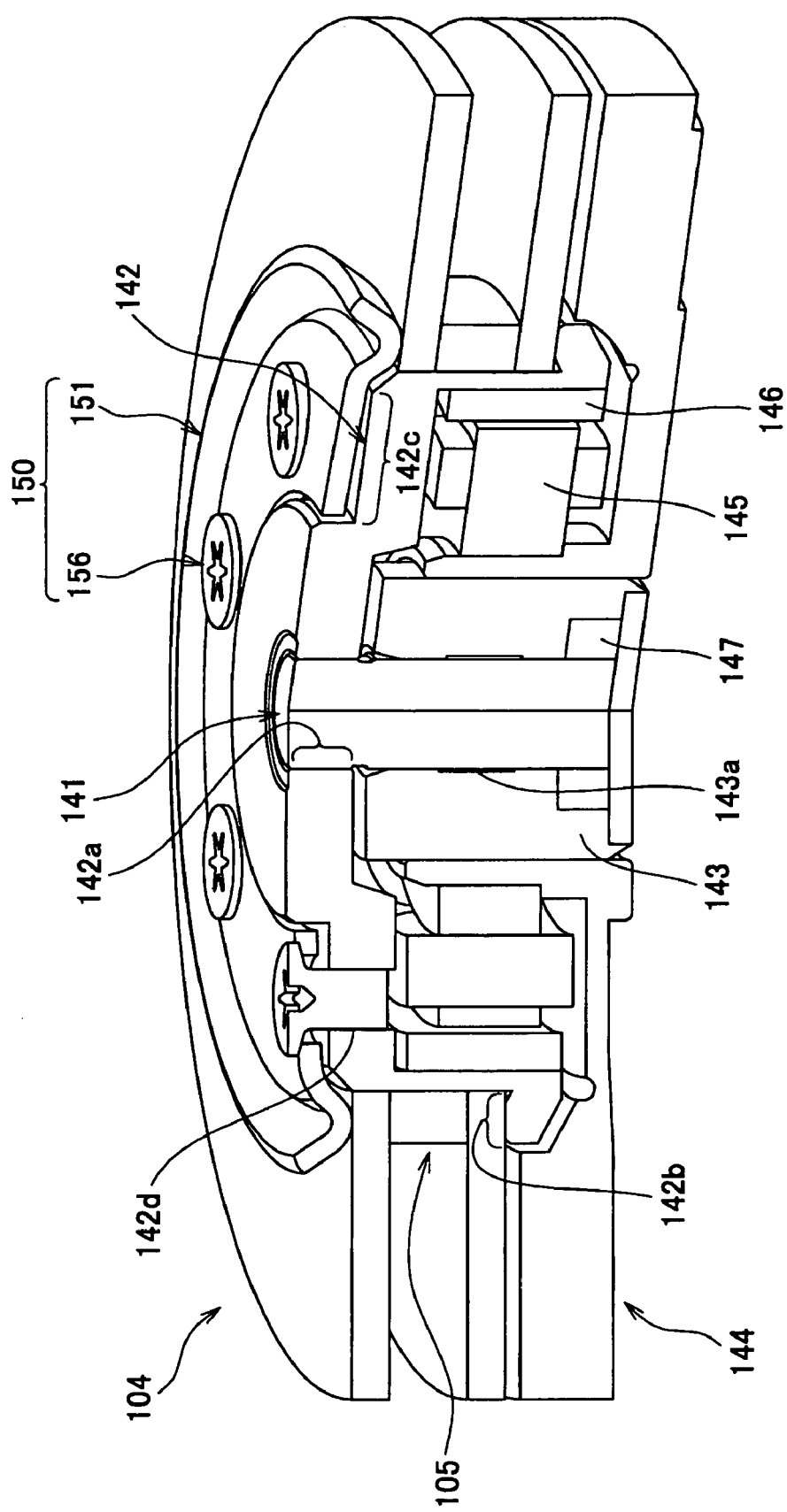
FIG. 3 is a partially sectional and perspective view near a spindle motor shown in FIG. 1.

The spindle motor 140 rotates the magnetic disc 104 at such a high speed as 10,000 rpm, and has, as shown in FIG. 3, a shaft 141, a (spindle) hub 142, a sleeve 143, a bracket (base) 144, a stator (core and coil) 145, and a magnet 146, a annular thrust plate 147, radial bearing (not shown), and lubricant oil (fluid) (not shown). In this embodiment, a yoke serves as the hub 142. The hub 142 and shaft 141 or the shaft 141 and the thrust plate 147 may be an integrated member. Here, FIG. 3 is a longitudinal sectional view of the spindle motor 140.

The shaft 141 rotates with the disc 104 and the hub 142.

The hub 142 is fixed onto the shaft 141 at its top 142a, and supports the disc 104 on its flange 142b. The hub 142 has an annular attachment surface 142c to which a clamp ring 151 of the clamping device 150 is attached. One or more (six in this embodiment) screw holes 142d are provided in the attachment surface 142c. While this embodiment provides six concentric screw holes 142d at regular intervals, the present invention does not limit the number of screw holes 142d to six, e.g., one, three, and four screw holes. When only one screw hole is provided, it is provided in the shaft 141 as the rotating center. Screws 156 of the clamping device 150 are engaged with these screw holes 142d.

While this embodiment attaches the clamp ring 151 of the claming device 150 to the hub 142, the present invention does not prevent the clamp ring 151 from being attached to the spindle as a rotor. In this case, there is no hub 142 and the disc 104 has a center hole. For instance, two magnetic discs 104 are used in order of the disc, a spacer 105, the disc and a clamp stacked on the spindle, and fixed by bolts coupled with the spindle.

The sleeve 143 is a member that allows the shaft 141 to be mounted rotatably. The sleeve 143 is fixed in the housing 102. While the shaft 141 rotates, the sleeve 143 does not rotate and forms a fixture part with a bracket 144. The sleeve 143 has a groove or aperture into which the lubricant oil is introduced. As the shaft 141 rotates, the lubricant oil generates the dynamic pressure (fluid pressure) along the groove.

The bracket (base) 144 is fixed onto the housing 102 around the sleeve 143, and supports the stator 145. The current flows through the stator 145, the magnet 146 and the yoke that serves as the hub constitute a magnetic circuit. The magnetic circuit faces a voice coil motor of a carriage, and is used to swing a head. The thrust plate 147 is arranged at a lower central part of the sleeve 143, and forms the thrust bearing. The radial bearing (not shown) is a dynamic pressure bearing that supports the shaft 141 in a non-contact manner via the lubricant oil. There are two or more radial bearings along the longitudinal direction of the shaft 141, and each radial bearing extends around the shaft 141. The radial bearing supports the load in the radial direction of the shaft 141.

The clamping device 150 serves to fix the disc 104 and the spacer 105 onto the spindle motor 140, and includes the clamp ring 151, and the (clamping) screws 156.

Figure 4A:
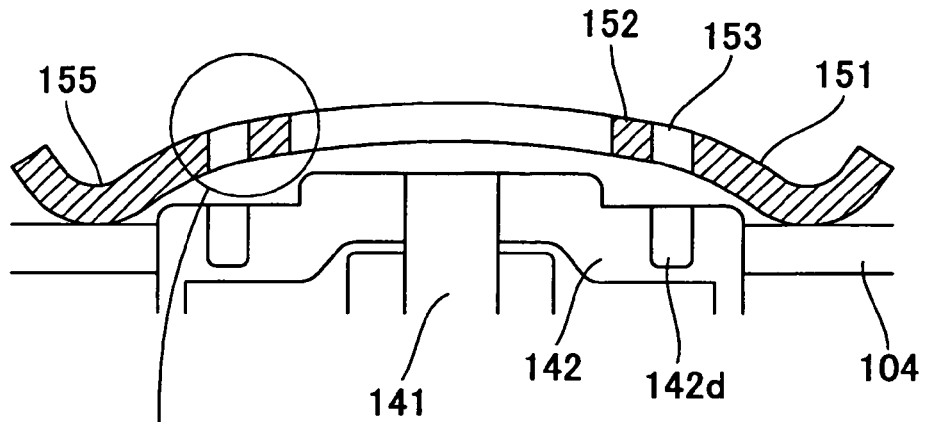
FIG. 4A is a schematic sectional view of a pre-screwed clamp ring.

The clamp ring 151 has an annular disc shape, and has a top surface 152, plural screw holes 153, which may not be tapped, and a pressure portion 155. FIG. 4A is a schematic sectional view of the pre-screwed clamp ring 151. As shown in FIG. 4A, the pre-screwed clamp ring 151 has a bowl shape with a convex upward such that its inner side is located more distant from the top surface of the hub 142 than its outer side, when it is placed on the disc 104 and the spindle motor 140 so that it is fixed by the screws 156. This inclination is constant along the circumference of the clamp ring 151. A detailed shape of the clamp ring 151 will be described with the screws 156.

Plural screw holes 153 are six screw concentric holes arranged at regular intervals in this embodiment. Similar to the screw holes 142d in the hub 142, the number of the screw holes 153 is not limited to six. The pressure portion 155 compresses and fixes the disc 104 onto the spindle motor 140. A detailed shape of the screw hole 153 will be described with the screw 156.

In attaching the clamp ring to the hub 142 by the screws 156 and pressing the discs 104, the disc 104 may deform near the screws 156. A large amount of this distortion would make unstable floating and positioning of the head 122, and lower the HDD's reliability. In order to reduce or remove this deformation, plural stress releasing holes may be formed concentrically among adjacent screw holes 153.

Each screw 156 fixes the clamp ring 151 onto the hub 142, and has a seating surface 157 that serves as a contact surface with the clamp ring 151 and inclines to a plane $H_1$ perpendicular to an axis of the screw 156 on a section that passes the axis of the screw (FIG. 4E). The screw 156 when tightened to the hub 142 generates a clamping force that fixes the disc 104 onto the hub 142. The clamping force is transmitted to the pressure portion 155 when the seating surface 157 of the screw 156 compresses a contact portion in the periphery of the screw hole 153. The clamping force prevents the external force from shifting or vibrating the disc 104, but a deformation amount of the disc 104 caused by the claming force should be minimized so as to maintain the head positioning precision.

A description will now be given of shapes of the clamp ring 151 and the screw 156.

Figure 4B:
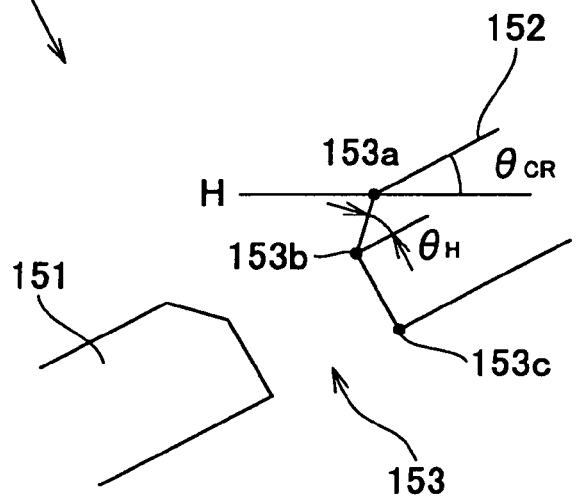
FIG. 4B is a partially enlarged sectional view of FIG. 4A.

A description will now be given of a shape of the clamp ring 151. FIG. 4B is an enlarged sectional view that exaggerates the screw hole 153 and its vicinity circled in FIG. 4A. The screw hole 153 has an top rim end 153a that defines an outer diameter of the screw hole 153, a middle rim end 153b and bottom rim end 153c which define an inner diameter of the screw hole 153. A top surface 152 inclines from the top rim end 153a to the middle rim end 153b. A diameter of the screw hole 153 decreases from the top rim end 153a to the middle rim end 153b. A line that connects the middle rim end 153b to the bottom rim end 153c is approximately parallel to the vertical direction after the clamp ring 151 is screwed. A diameter of the screw hole 153 is constant between the middle rim end 153b and the bottom rim end 153c, although the diameter can change between the thread and the root of thread when the screw hole is threaded between the middle rim end 153b and the bottom rim end 153c. In this case, the middle and bottom rim ends 153b and 153c may be regarded as threads.

The top rim end 153a is the most inner end portion on a rim in the top surface 152, and contacts the seating surface 157 of the screw 156 in the screw hole 153. An initial inclination angle of the clamp ring 151 is an angle $\theta_{CR}$ between the top surface 152 and the horizontal plane H that passes the top rim end 153a (on the section shown in FIG. 4B) at the initial state or pre-screwed state shown in FIG. 4A. Although the angle $\theta_{CR}$ is not constant on the top surface 152, it is considered almost constant in a range contacting the seating surface 157.

Assume that $\theta_H$ is an angle between a line that connects the top rim end 153a to the middle rim end 153b in FIG. 4B and the post-screwed horizontal plane H. The angle $\theta_H$ may slightly change after the attachment, but this embodiment assumes that the angular variation is negligible. Therefore, in the pre-screwed state, the angle $\theta_H$ is an angle in FIG. 4B between the line that connects the top rim end 153a to the middle rim end 153b in FIG. 4B and the line that extends from the middle rim end 153b and is approximately parallel to the top surface 152 or the bottom surface of the clamp ring 151 in FIG. 4B.

Figure 4C:
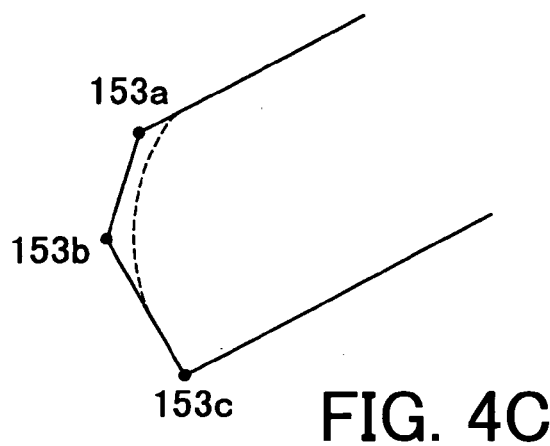
FIG. 4C is a partially enlarged sectional view of FIG. 4B.

The top and middle rim ends 153a and 153b are chamfered by a smooth curved plane (or curve on the section) as shown in by a dotted line in FIG. 4C. For example, they may be approximated by an arc section. This configuration would be able to prevent damages of the disc 104 due to generations of burrs or contaminations. Here, FIG. 4C is a partially enlarged sectional view of FIG. 4B.

A description will now be given of a shape of the screw 156. FIG. 3 is a partially sectional and perspective view of the clamp ring 151 in the post-screwed state. FIG. 4D is its partially enlarged sectional view. FIG. 4E are partially enlarged sectional view of FIG. 4D. As shown in FIG. 4E, the seating surface 157 inclines at an angle $\theta_S$.

This embodiment defines angles $\theta_{CR}$, $\theta_H$, and $\theta_S$ as follows:

$$\theta_S > \theta_{CR} \quad \text{[EQUATION 1]}$$

This configuration enables the seating surface 157 to first contact and compress the rim end 153a of the clamp ring 151 so that the screw portion moves to the center of the screw hole 153. As a result, this configuration has a centering effect of the clamp ring 151. If $\theta_S \leq \theta_{CR}$, the seating surface 157 contacts the top surface 152 instead of the rim end 153a and shifts the rim end 153a without the centering effect. Since plural screws 156 do not have the same contacting state, the clamp ring 151 shifts depending upon the first tightened screw 156. This is particularly problematic in retightening (step 1012) which will be described with reference to FIG. 5.

When the clamp ring 151 has a flat shape unlike the bowl shape in this embodiment, $\theta_{CR}=0$ and thus $\theta_S>0$.

Preferably, Equation 1 satisfies the following equation:

$$\theta_S \approx 2\theta_{CR} \quad \text{[EQUATION 2]}$$

Equation 1 provides the centering effect, but the excessively large inclination angle of the seating surface 157 cannot maintain the height of the housing 102, because 1) the housing 102 of the HDD 100 should use a standardized height, and 2) the screw head of the screw 156 needs a predetermined strength by securing a predetermined thickness or greater. "About twice" is a practical value that meets Equation 1 while maintaining the height of the housing 102.

$$\theta_H \geq \theta_S \quad \text{[EQUATION 3]}$$

The position restraining effect of the clamp ring 151 enhances, if the screw hole 153 of the clamp ring 151 has an inclination greater than the inclination angle of the seating surface 157. Preferably, Equation 3 meets the following Equation:

$$\theta_H \approx 3\theta_S \quad \text{[EQUATION 4]}$$

"Three times" is a practical value to obtain an enhanced position restraining effect while maintaining a height of the HDD 100.

Figure 5:
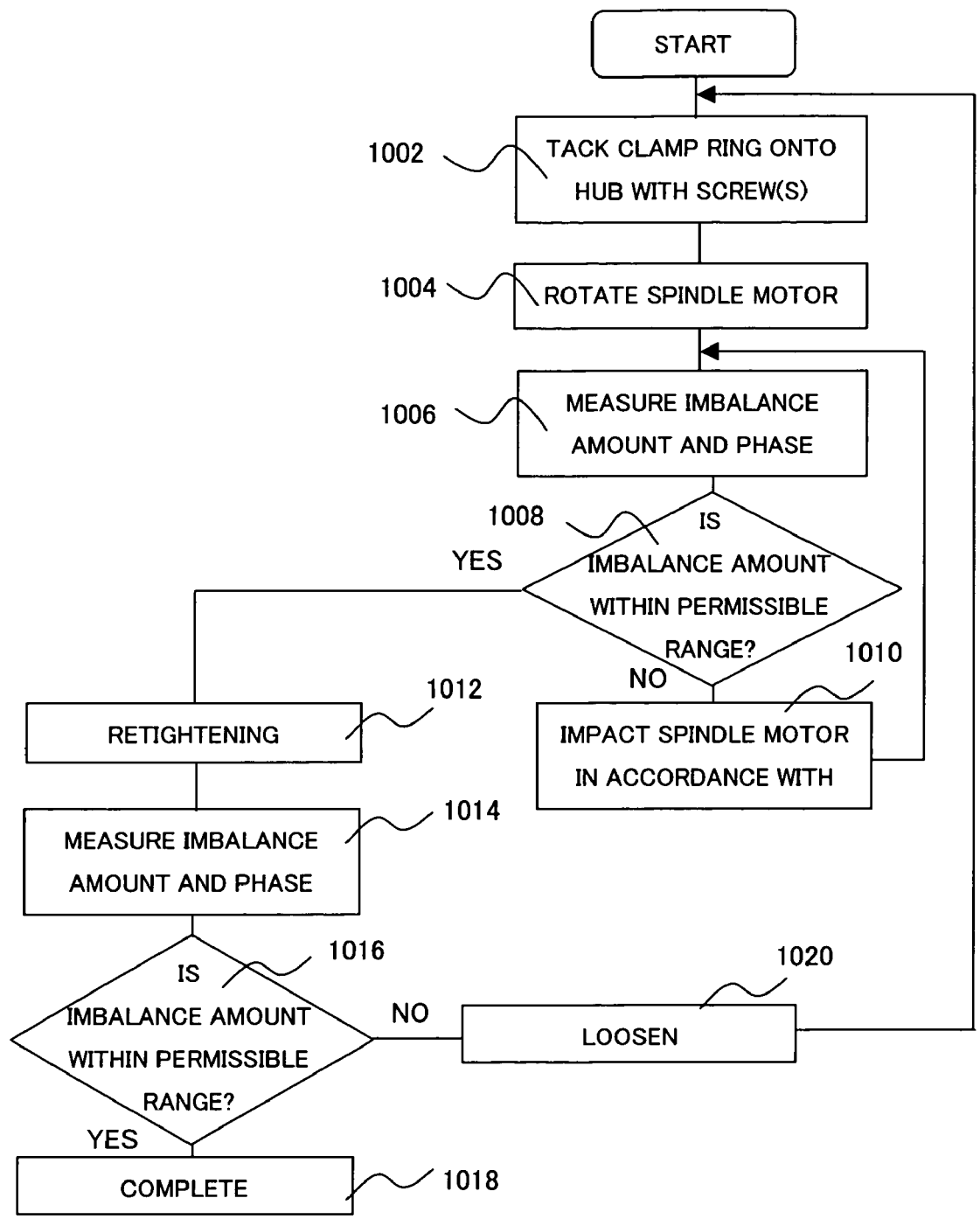
FIG. 5 is a flowchart of an imbalance removing method of this embodiment.

Referring now to FIG. 5, a description will be given of a comparison of the clamping action between the conventional section method and the clamping device 150. First, the clamp ring 151 is tacked by the screws 156 (step 1002). In step 1002, under Equation 2, the seating surface 157 of the screw 156 first contacts the inclined rim 153a, and compresses part of the inclined rim 153a of the clamp ring 151 so that the screw portion becomes located at the center of the screw hole 143.

Next, a spindle motor 150 is rotated (step 1004). Thereby, the imbalance is generated in the radial direction. Next, the imbalance amount and the phase are measured (step 1006). Step 1006 uses, for example, an acceleration sensor.

Next, it is determined whether the imbalance is within a permissible range (step 1008). When it is determined that the imbalance amount is not within the permissible range (step 1008), the spindle motor 140 is impacted at the timing of an antiphase of the above phase (step 1010). Thereby, the imbalance amount is cancelled. Step 1010 uses, for example, a piezoelectric element.

On the other hand, when it is determined that the imbalance amount is within a permissible range (step 1008), the screws 156 are retightened (step 1012). As the screw 156 is tightened, the clamp ring 151 elastically deforms in the tightening direction of the screw 156. The tightening force of the screw 156 elastically deforms the clamp ring 151 so that the its inner circumference side approaches to the hub 142, and its top surface becomes parallel to the surface of the disc 104.

Next, the imbalance amount and the phase are measured (step 1014). Step 1014 uses, for example, an acceleration sensor. Next, it is determined whether the imbalance amount is within the permissible range (step 1016).

When it is determined that the imbalance amount is within the permissible range (step 1016), the clamping process ends (step 1018). On the other hand, when it is determined that the imbalance amount is not within the permissible range (step 1016), the screws are loosened and the procedure is fed back to step 1002.

This embodiment prevents a shift of the clamp ring 151 in steps 1002 and 1012, and deals with a clamping operation swiftly. In addition, this embodiment is not limited to the second embodiment, and applicable to the conventional first and third methods. When this embodiment is applied to the third embodiment, an additional balancing weight should be made light or needless.

WORKING EXAMPLE 1

This example sets the angle $\theta_{CR}$ to 2°, the angle $\theta_H$ to about 15°, and the angle $\theta_S$ to about 5°. The deterrent of a shift of the clamp ring 151 per one screw is given by a subtraction value of the force that occurs at the retightening time in step 1012 from the force that occurs at the initial tightening in step 1002.

The force that occurs at the tightening time is a sum of a frictional component and a seating-surface taper component. The frictional component is a product between an axial force that is a compression force of one screw against the clamp ring 151, and a coefficient of friction: Axial force 1 kgf× μ0.4=0.4 kgf. On the other hand, the seating-surface taper component is as follows: Axial force 1 kgf×tan 5°=0.09 kgf. Therefore, the force that occurs at the initial tightening is 0.49 kgf.

The force that occurs at the retightening time can be defined as a rotating force generated by the opposite screw 156. Assume that (radius ratio)=(a distance between screws)/(a radius between a screw seating surface and a clamping screw hole's contact part). Then, it is axial force 10 kgf×μ0.4/screw position radius ratio 10. As a result, the force that occurs at the retightening time is 0.4 kgf.

From the above, the deterrent to a shift of the clamp ring 151 becomes 0.09 kgf. In the working example 1, if the axial force that occurs at the retightening time is 1/10 as large as that at the initial tightening time, the positional shift of the clamp ring 151 does not occur. In other words, no shift occurs when the increase amount at the tightening time is made smaller than that at the initial tightening. Thus, a number of retightening operations are needed up to the final retightening. An application of this embodiment could secure a large retightening amount, and reduce the number of retightening operations.

Figure 6A:
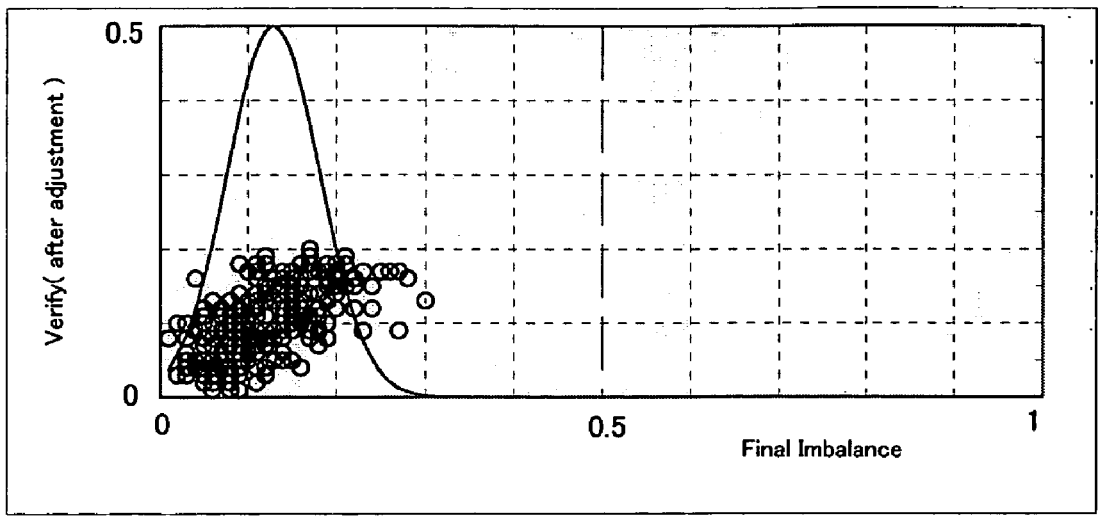
FIG. 6A is a graph for explaining an effect of an imbalance reduction effect that applies this embodiment.
Figure 6B:
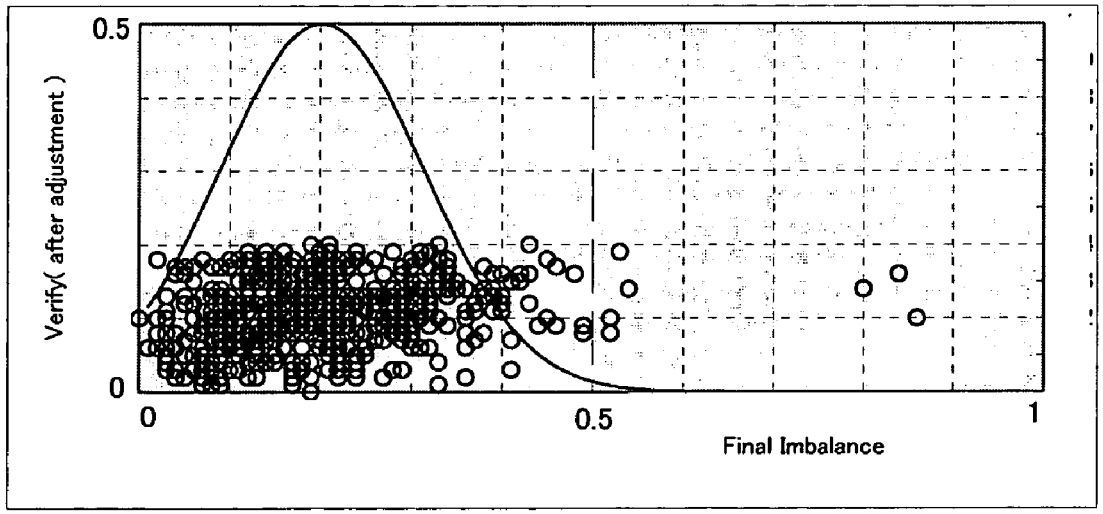
FIG. 6B is a conventional graph that shows an imbalance that does not have an effect of this embodiment shown in FIG. 6A.

FIGS. 6A and 6B show imbalance changes after step 1012. The abscissa axis denotes an imbalance amount in the initial measurement (step 1006), and the ordinate axis denotes the imbalance amount in the initial measurement after the retightening (step 1014). FIG. 6A is a graph when this embodiment is applied, and FIG. 6B is a graph when this embodiment is not applied. It is understood that the imbalance amount reduces when this embodiment is applied.

Figure 7:
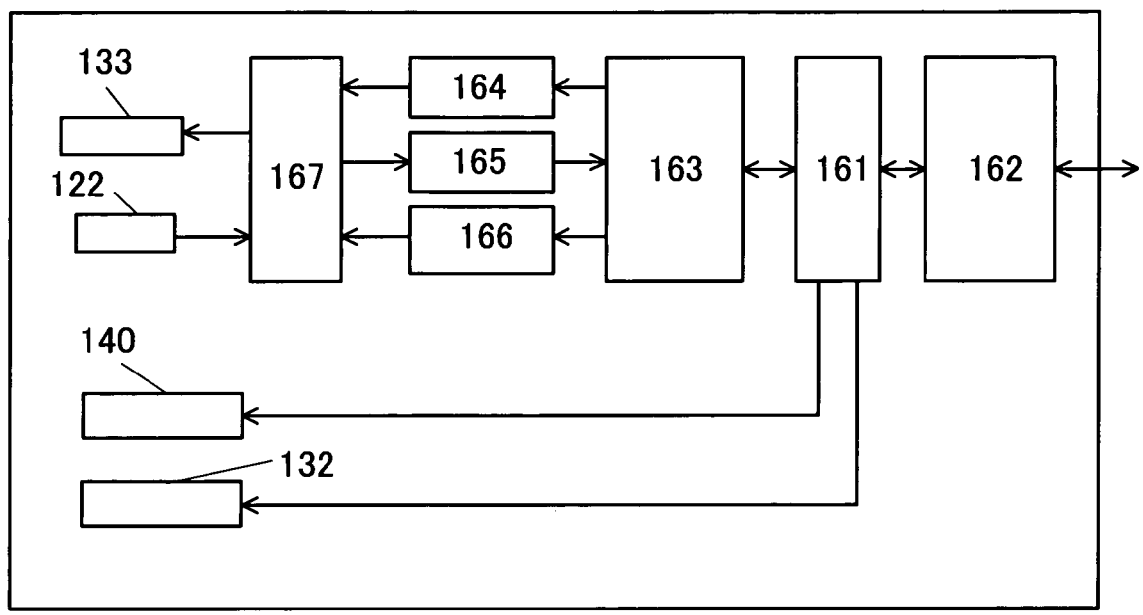
FIG. 7 is a block diagram of a control system in the HDD shown in FIG. 1.

FIG. 7 shows a control block diagram of a control system 160 in the HDD 100. The control system 160 is a control illustration in which the head 122 has an inductive head and an MR head. The control system 160, which can be implemented as a control board in the HDD 100, includes a controller 161, an interface 162, a hard disc controller (referred to as "HDC" hereinafter) 163, a write modulator 164, a read demodulator 165, a sense-current controller 166, and a head IC 167. Of course, they are not necessarily integrated into one unit; for example, only the head IC 167 is connected to the carriage 132.

The controller 161 covers any processor such as a CPU and MPU irrespective of its name, and controls each part in the control system 160. The interface 162 connects the HDD 100 to an external apparatus, such as a personal computer ("PC" hereinafter) as a host. The HDC 163 sends to the controller 161 data that has been demodulated by the read demodulator 165, sends data to the write modulator 164, and sends to the sense-current controller 166 a current value as set by the controller 161. Although FIG. 5 shows that the controller 161 provides servo control over the spindle motor 140 and (a motor in) the carriage 132, the HDC 163 may serve as such servo control.

The write modulator 164 modulates data and supplies data to the head IC 162, which data has been supplied, for example, from the host through the interface 162 and is to be written down onto the disc 104 by the inductive head. The read demodulator 165 demodulates data into an original signal by sampling data read from the disc 104 by the MR head device. The write modulator 164 and read demodulator 165 may be recognized as one integrated signal processing part. The head IC 167 serves as a preamplifier. Each part may apply any structure known in the art, and a detailed description thereof will be omitted.

In operation of the HDD 100, the controller 161 drives the spindle motor 140 and rotates the disc 104. As discussed above, the clamping device 150 reduces or eliminates the imbalance amount of the clamp ring 151, and the rotating precision of the disc 104 is high. The clamping force applied by the clamp ring 151 prevents an offset of the disc 104 from the external impact, while maintaining a deformation amount of the disc 104. As a result, this embodiment can provide a high head positioning precision.

The airflow associated with the rotation of the disc 104 is introduced between the disc 104 and slider 121, forming a minute air film and thus generating the buoyancy that enables the slider 121 to float over the disc surface. The suspension 130 applies an elastic compression force to the slider 121 in a direction opposing to the buoyancy of the slider 121. The balance between the buoyancy and the elastic force spaces the magnetic head part 120 from the disc 104 by a constant distance.

The controller 161 then controls the carriage 132 and rotates the carriage 132 around the support shaft 134 for head 122's seek for a target track on the disc 104.

In writing, the controller 161 receives data from the host (not shown) such as a PC through the interface 162, selects the inductive head device, and sends data to the write modulator 164 through the HDC 163. In response, the write modulator 164 modulates the data, and sends the modulated data to the head IC 167. The head IC 167 amplifies the modulated data, and then supplies the data as write current to the inductive head device. Thereby, the inductive head device writes down the data onto the target track.

In reading, the controller 161 selects the MR head device, and sends the predetermined sense current to the sense-current controller 166 through the HDC 163. In response, the sense-current controller 166 supplies the sense current to the MR head device through the head IC 167. Thereby, the MR head reads desired information from the desired track on the disc 104.

Data is amplified by the head IC 167 based on the electric resistance of the MR head device varying according to a signal magnetic field, and then supplied to the read demodulator 165 to be demodulated to an original signal. The demodulated signal is sent to the host (not shown) through the HDC 163, controller 161, and interface 162.

Further, the present invention is not limited to these preferred embodiments, and various modifications and variations may be made without departing from the spirit and scope of the present invention.

What is claimed is:

1. A clamping device that fixes a disc onto a spindle motor that rotates the disc, said clamping device comprising:
    a clamp ring configured to cap the disc, the clamp ring having a plurality of concentrically arranged screw holes; and
    a plurality of screws each configured to be inserted into a corresponding one of the screw holes and to fix said clamp ring onto the spindle motor, each screw including a head, a shaft part including a threaded portion, and a neck located between the head and the shaft part, the head having a seating surface as a back surface configured to contact the clamp ring and to incline relative to a plane perpendicular to a central axis of the screw, the seating surface of said screw having an inclined angle greater than a plane that contacts the seating surface of said screw of said clamp ring before said clamp ring is fixed by said screw, and the neck being tapered from the seating surface to the shaft part so that the neck can incline relative to the plane perpendicular to the central axis of the screw at an angle greater than that of the seating surface.

2. A clamping device according to claim 1, wherein said clamp ring has a screw hole into which said screw is inserted, and
    wherein an inclination angle of the screw hole is greater than that of the seating surface of said screw.

3. A clamping device according to claim 2, wherein said clamp ring has a portion that contacts the seating surface and has an arc-shaped section.

4. A disc drive comprising a clamping device according to claim 1.

5. A clamping method for fixing a disc onto a spindle motor configured to rotate the disc via a clamp ring having a plurality of concentrically arranged screw holes by using a plurality of screws, said clamping method comprising the step of positioning to each screw hole a corresponding one of the screws configured to be inserted into the screw hole and to fix the clamp ring onto the spindle motor,
    wherein each screw includes a head, a shaft part including a threaded portion, and a neck located between the head and the shaft part, the head having a seating surface as a back surface configured to contact the clamp ring and to incline relative to a plane perpendicular to a central axis of the screw, the seating surface of said screw having an inclined angle greater than a plane that contacts the seating surface of said screw of said clamp ring before said clamp ring is fixed by said screw, and the neck being tapered from the seating surface to the shaft part so that the neck can incline relative to the plane perpendicular to the central axis of the screw at an angle greater than that of the seating surface.

* * * * *